3,745,203
PROCESS FOR MOLDING POLYURETHANE UTILIZING A MIXTURE OF TWO BLOWING AGENTS

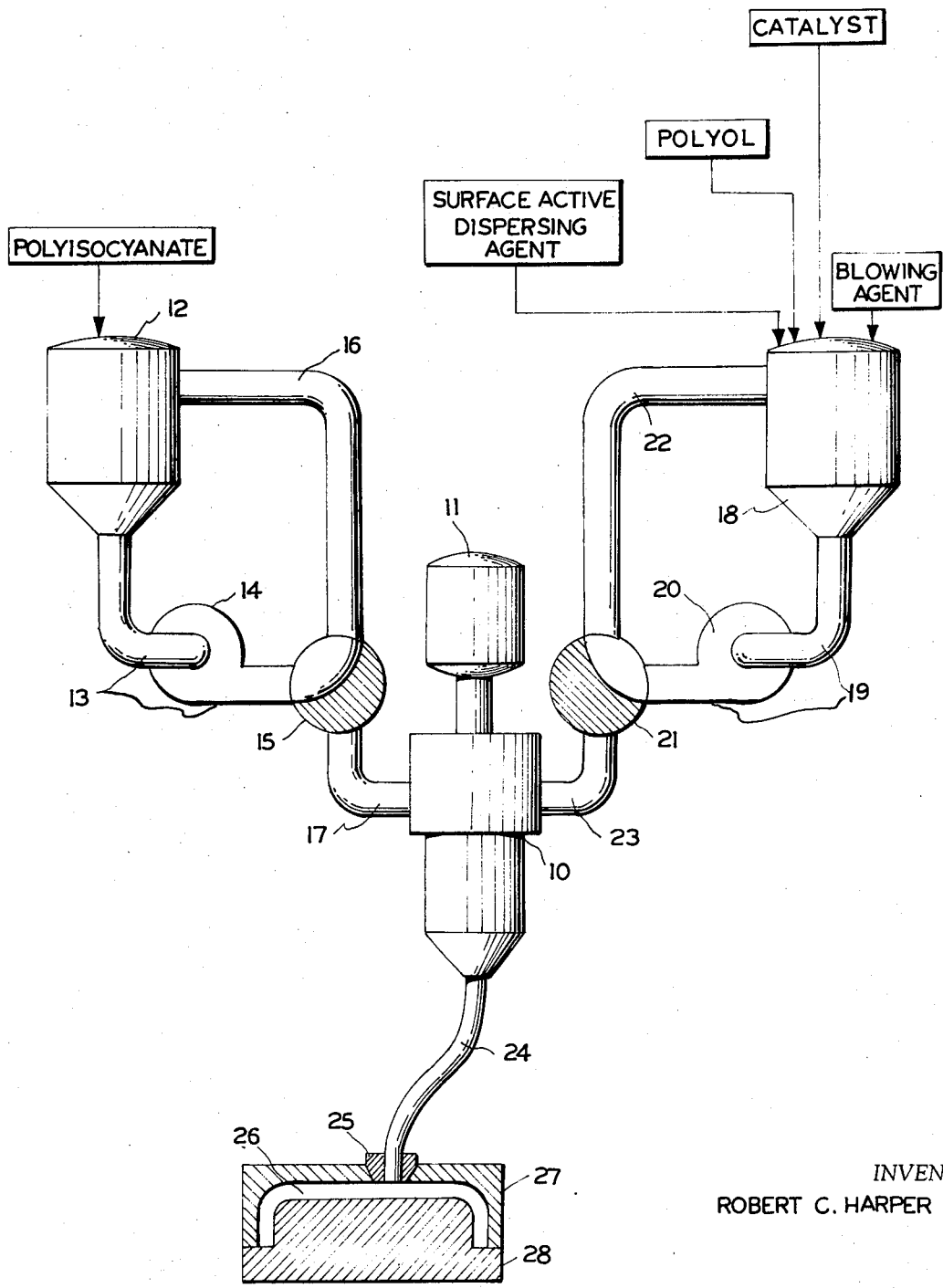

Robert C. Harper, Loveland, Ohio, assignor to The Cincinnati Milling Machine Co., Cincinnati, Ohio
Continuation of abandoned application Ser. No. 881,823, Dec. 3, 1969. This application Aug. 19, 1971, Ser. No. 173,301
Int. Cl. B29d 27/00; C08g 22/44, 53/10
U.S. Cl. 264—48   6 Claims

ABSTRACT OF THE DISCLOSURE

A process for the production of uniform polyurethane moldings substantially free of surface voids, by (1) mixing a polyisocyanate, a polyol, and a blowing agent;
(2) passing the resultant liquid nonexpanded mixture into a closed mold;
(3) allowing the liquid to expand and fill the mold as the polyurethane is formed; and
(4) curing and removing the resultant molded article;

employing as a blowing agent a mixture of two volatile blowing agents, i.e., dichlorodifluoromethane and trichloromonofluoromethane, which mixture when incorporated into the nonexpanded liquid molding mixture exhibits a vapor pressure of not more than one atmosphere at 110° F. The process is useful for production of molded articles for structural purposes, furniture, etc.

---

This application is a continuation of Ser. No. 881,823, filed Dec. 3, 1969, now abandoned.

The production of polyurethane castings in open molds from a mixture of a polyol and a polyisocyanate is well known in the art. Such a procedure is employed to make slabs of foam or to fill cavities with an insulative material having a density of approximately 1.5–4.0 lbs./cu. ft. Moldings of polyurethane foams have also been made in closed molds, but such moldings have exhibited a number of undesirable features, such as nonuniform cell size, broad distribution of cell sizes, internal voids, surface voids, undesirable variations in density, bubbles, fish-eyes, and other inhomogeneities. If the molding is made of sufficiently dense material, i.e. 30–50 lbs./cu. ft., many of these undesirable features disappear, but if the molding is of an intermediate density, i.e. 10–30 lbs./cu. ft., such that it is definitely cellular as derived from a foam, these undesirable features have not been avoided in the prior art. Therefore, in order to provide a molding with a smooth, hard surface, it has been customary to affix a separate material to the surface of the moldings. Considerable effort has been expended in attempts to eliminate this latter step and produce so-called self-skinned moldings, i.e. moldings with a dense, structurally strong skin and a light weight cellular interior.

It is an object of the present invention to provide a novel process for the production of polyurethane moldings substantially free from the disadvantages of the prior art.

Another object is to provide a process for the production of polyurethane moldings having a uniform cell size regardless of the size of the molding.

Still another object is to provide a process for preparing polyurethane molding material which completely fills out a closed mold to produce an accurate reproduction of the mold cavity.

Yet another object is to provide a process for producing polyurethane moldings having a narrow cell size distribution.

Additional objects and advantages will be apparent by reference to the following detailed description and the sole figure of the drawing wherein there is schematically shown an apparatus suitable for practicing the process of the present invention.

According to the present invention there is provided a process for the production of uniform polyurethane moldings substantially free of surface voids, comprising the steps of:

(1) mixing a polyisocyanate, a polyol, and a blowing agent;
(2) passing the resultant liquid nonexpanded mixture into the cavity of a closed mold;
(3) allowing the liquid to expand and fill the mold cavity as the polyurethane is formed; and
(4) curing and recoving the resultant molded article as an accurate reproduction of the mold cavity;

wherein the blowing agent is a material which, after being mixed with said polyisocyanate and said polyol to produce said resultant liquid, unreacted and nonexpanded mixture, exhibits a vapor pressure of not greater than one atmosphere at 120° °F. Preferably the blowing agent material is a mixture of at least two chlorofluoralkanes, the least volatile of which has an atmospheric boiling point of 30° to 120° F. and the most volatile of which has an atmospheric boiling point of −50° to 50° F., the difference between the boiling points of said least volatile and said most volatile liquids being from 30° to 150° F.

Referring now to the drawing which is in the form of a diagrammatic representation of the apparatus and process, there is shown an apparatus comprising a mixing chamber 10 having therein a rotating impeller or other agitation means, not shown, driven by any suitable power source, such as the motor 11. In liquid communication with the chamber 10 is a tank 12 adapted to hold the polyisocyanate component. The tank 12 which, optionally, may be fitted with a means for agitating its contents, has an outlet line 13 leading to the inlet of a suitable liquid pump 14 which is capable of forcing the polyisocyanate component at any desired flow rate through the connecting lines. Also in line 13 is three-way valve 15 adapted to direct the polyisocyanate back to the tank 12 through line 16 or into the chamber 10 through line 17. A substantially identical combination of equipment and conduit lines handles the polyol component, which preferably comprises the polyol, minor amounts of a surface-active dispersing agent, a catalyst, and a blowing agent. Tank 18, which preferably is fitted with means for agitating its contents, discharges through line 19 containing a suitable liquid pump 20, capable of forcing the polyol component at any desired flow rate through the connecting lines. Also in line 19 is three-way valve 21 adapted to direct the polyol component back to tank 18 through line 22 or into the chamber 10 through line 23. The chamber 10 discharges through flexible line 24 and nozzle 25 into mold cavity 26 of a closed mold, comprising upper half 27 and lower half 28.

In operation the pumps 14 and 20 are caused to operate after the valves 15 and 21 have been arranged such that the polyisocyanate component and polyol component each recirculate respectively through lines 16 and 22. When ready to produce a molding, valves 15 and 21 are simultaneously adjusted to direct the polyisocyanate component through line 17 and the polyol component through line 23 into the chamber 10. In the chamber 10 these two liquids are intimately mixed and discharged through line 24 into mold cavity 26.

It is to be understood that the foregoing description of the operation of this apparatus and process is not limiting, since many variations are permissible and equally feasible in different embodiments of this invention. As typical examples which may be mentioned (a) some or all of the catalyst, dispersing agent, and/or blowing agent may be mixed with the polyisocyanate in tank 12 rather than with the polyol in tank 18; (b) line 24 may be eliminated by having chamber 10 discharge directly into mold cavity 26; and (c) a valve may be incorporated into line 24 for flow control in filling mold cavity 26 or if such a valve is omitted, suitable control means can be employed to operate valves 15 and 21 to accomplish the same result. Many other alternative devices and methods will be apparent to those skilled in the art of polyurethane foams.

The polyisocyanates employed in the process of this invention may be any of the usual types containing at least two free isocyanate groups per molecule, although the aromatic polyisocyanates are preferred, i.e. those in which an aromatic ring structure is in the backbone of the molecule separating the isocyanate groups or forming the nucleus to which the isocyanate groups are attached. The polyisocyanate may be a monomeric material, such as toluene diisocyanate, or it may be a prepolymer in which a diisocyanate has been reacted with less than a stoichiometric amount of a polyol to produce a low molecular weight polymeric material, usually called a "prepolymer," having two or more free isocyanate groups. The preferred polyisocyanates have an average of 2–5 free isocyanate groups per molecule. In general, the polyisocyanate materials employed in this invention are those which arme commercially available and commonly employed in the preparation of polyurethane products. Examples of useful polyisocyanates include but are not limited to toluene-2,4-diisocyanate,
1,5-naphthalene-diisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran, and
2,4,6-toluenetriisocyanate, and the low molecular weight prepolymers resulting from the reaction of any of the above polyisocyanates with less than a stoichiometric amount of a polyol, many of which will be described hereinbelow.

Any polyol or mixture of polyols heretofore employed in the production of polyurethane moldings can be employed in the present invention. These include polyols having at least two hydroxyl groups per molecule, and preferably 3–5 hydroxyl groups per molecule. Examples of suitable polyols include the polyhydric alcohols, polyether alcohols, and cyclic polyhydric alcohols, such as glycols, glycerol, trimethylol propane, pentaerythritol, trimethylol ethane, α-methyl glucoside, sucrose, glucose, mannose, maltose, sorbitol, mannitol, galactitol, and the various ethoxylated or propoxylated derivatives of such polyols, and the like.

The critical feature of this invention is the blowing agent, which is a volatile material that exhibits a vapor pressure of not more than one atmosphere at 110° F. when mixed into the polyurethane-forming components. Preferably the blowing agent is a mixture of two or more liquids of different volatilities which dissolve in or are miscible with the polyurethane-forming components. In general, these liquids should be chosen such that the least volatile material has an atmospheric boiling point of 30° to 120° F. and the most volatile material has an atmospheric boiling point of −50° to 50° F., the relationship between the two being such that the difference in their boiling points is from 30° to 150° F. By employing such a combination of volatile materials, the expanding foam can be controlled both as to its rate of expansion and as to its polymerization. As the polymerization proceeds, the foam becomes more solid and rigid as the exothermic polymerization reaction approaches completion. At the same time, the blowing agents are vaporizing as the temperature and pressure conditions of the reaction permit, and producing foam from the polymerizing liquid. It is necessary in order to produce a product of the desired density that the vaporization rate is controlled to correspond with the polymerization rate in a predetermined manner. If the blowing agents vaporize too quickly, the resultant product is frothy and there is no means of controlling the quality of the final product. If the blowing agents vaporize too slowly, substantially no foam is produced because the polymerizing mixture solidifies before the vapor is produced. It has been found that if the blowing agent has certain vaporization characteristics under the reaction conditions, the foam which is produced is homogeneous, has a uniform cell structure, a dense outer skin, and is substantially free of surface voids. The foam fills out the mold cavity completely and produces a quality molding.

In the preferred embodiment of this invention the blowing agents comprise a mixture of at least two volatile liquids, the least volatile of which has an atmospheric boiling point of 30° to 120° F. and the most volatile of which has an atmospheric boiling point of −50° to 50° F., with the rifference between the boiling points of these two liquids being from 30° to 150° F. While it is feasible to employ as a blowing agent a material which sublimes directly from a solid to a vapor, it is preferable and much more convenient to employ a material which vaporizes from the liquid state to the vapor state. One of the principal advantages of employing a liquid is that it can be more readily dissolved in the liquid components used to prepare the polyurethane foam. Among the materials which may be employed in certain embodiments of this invention are methyl formate, bromoethane, n-pentane, cyclopentane, diethyl ether, dimethyl sulfide, ethyl chloride, nitrous oxide, n-propane, 2,2-dimethyl propane, methyl ethyl ether, and many other more or less volatile liquids well-known to those skilled in this art. The most desirable flowing agents, however, are the fluorocarbons, chlorofluorocarbons, bromofluorocarbons, and perfluorocarbons. Included among these materials are monochlorodifluoromethane,
dichlorodifluoromethane,
trifluoromethane,
monofluorodichloromethane,
monochlorotrifluoromethane,
tetrafluoromethane,
monobromotrifluoromethane,
dibromotetrafluoroethane,
difluorotetrachloroethane,
trichlorotrifluoroethane,
dichlorotetrafluoroethane,
monochloropentafluoroethane,
hexafluoroethane,
octafluorocyclobutane, and the like. The preferred materials from among this group are the fluorochloroalkanes, particularly dichlorodifluoromethane, monofluorotrichloromethane, dichlorotetrafluoroethane, and trichlorotrifluoroethane.

The mixture of at least two blowing agents employed in this invention must have certain vaporization capabilities as described above. Particularly suitable combinations are those which employ a chlorofluorocarbon as at least one of the ingredients of the mixture, although this is a preferred combination and not a critical limitation on the invention. Such combinations include but are not limited to the following in which the less volatile component is the first of the two in each combination:

Monofluorotrichloromethane—dichlorodifluoromethane
Trichlorotrifluoroethane/dichlorodifluoromethane
Monofluorotrichloromethane/dichlorotetrafluoroethane
Trichlorotrifluoroethane/dichlorotetrafluoroethane
Monofluorotrichloromethane/n-propane
Monofluorotrichloromethane/ethyl chloride
Trichlorotrifluoroethane/n-propane
Trichlorotrifluoroethane/ethyl chloride
Methyl formate/dichlorodifluoromethane
Methyl formate/dichlorotetrafluoroethane
Bromoethane/dichlorodifluoromethane
Bromoethane/dichlorotetrafluoroethane
Methyl formate/n-propane
Methyl formate/ethyl chloride
Bromoethane/n-propane
Bromoethane/ethyl chloride The preferred combinations are the first four of this listing, and the most desirable of all, for reasons of economics and ease of operation, is the combination of monofluorotrichloromethane/dichlorodifluoromethane.

In a broad sense the blowing agents must be of different volatilization characteristics, and when incorporated into the unreacted and unexpanded mixture of polyol component and polyisocyanate component will produce a resultant liquid that has a vapor pressure not exceeding one atmosphere at 110° F. It is impossible to provide any meaningful range of weight proportions of two or more blowing agents which might be applicable to all possible combinations, since the properties of the polyol-polyisocyanate mixture also affect the flowing agent composition and concentration. Once the components of the mixture and the particular blowing agents are chosen, however, it is merely a matter of routine experimentation to determine the range of proportions. With respect to a mixture of two chlorofluoroalkanes, such as those mentioned above, the weight ratio of the less volatile to the more volatile blowing agent should be from about 1/1 to about 20/1. When the choice is narrowed to the first four combinations in the above list of combinations, the ratio of the less volatile to the more volatile agent should be about 5/1 to 16/1. More particularly, when employing the combination of monofluorotrichloromethane/dichlorodifluoromethane, the proportion of these two ingredients respectively should be from 6/1 to about 12/1 for the best results.

The concentration of blowing agent in the entire expandable polyurethane mix cannot be given with precison for all combinations of blowing agents, although this would usually range from about 1% to about 25% by weight of the total mix. With respect to the preferred blowing agents, the fluorine-containing liquids, the range is about 1% to about 20% of the total mix.

The invention is further illustrated by way of the following examples in which all parts and percentages are by weight, and temperatures are in degrees centigrade, unless otherwise indicated. The examples are illustrative of certain embodiments designed to teach those skilled in the art how to practice the invention and are not intended to limit the scope of the invention in any manner whatsoever.

EXAMPLE 1

This example describes the preparation of a polyol component for subsequent use in making a polyurethane foam. The polyol component was made in a 12 liter, 4-neck flask fitted with stirrer, a Dry Ice condenser topped with a drying tube, and an addition funnel topped with a Dry Ice condenser and drying tube. There was charged to the flask 7821 g. of the commercially available polyol, reported to be a propoxylated mixture of 75% α-methyl glusocide and 25% glycerol, the mixture having a hydroxyl number of 435, 135 g. of the commercially available silicone dispersing agent (described in U.S. 3,402,192), and 54.0 g. of N,N,N',N'-tetramethyl-1,3-butanediamine (TMBDA) as a catalyst. After 990 g. of monofluorotrichloromethane was weighed into an addition funnel, the funnel was attached to the flask, Dry Ice/acetone condensers were attached, and the monofluorotrichloromethane was added to the flask and blended with the other ingredients. The resulting mixture was a polyol component containing no dichlorodifluoromethane.

EXAMPLE 2

This example describes the preparation of a polyol component for subsequent use in making a polyurethane foam. In the equipment described in Example 1, a similar polyol component was prepared using the same weights of the same polyol, TMBDA, and dispersing agent. After 803.9 g. of monofluorotrichloromethane was placed in the addition funnel, it was partially immersed in an acetone-Dry Ice bath, and 186.1 g. of dichlorodifluoromethane vapor was absorbed into the cold monofluorotrichloromethane in the addition funnel. Upon addition to the contents of the addition funnel to the flask, rapid boiling of the vapors of monofluorotrichloromethane and dichlorodifluoromethane caused a loss of 52 g. of vapor through the condenser and drying tube. The loss was made up by adding 52 g. additional monofluorotrichloromethane. (The loss was estimated to be 31.1 g. dichlorodifluoromethane and 20.9 g. monofluorotrichloromethane, based on calculations of mol percent and partial pressure of each of the two materials at the temperature of the mixture in the flask.) The actual proportion of dichlorodifluoromethane in the mixture of monofluorotrichloromethane and dichlorodifluoromethane was 15.7%.

EXAMPLE 3

This example describes the preparation of a polyol component for subsequent use in making a polyurethane foam. A 25 gallon glass-lined water heater tank supported on a ball mill drive was used as a vessel for preparing the polyol component under pressure at room temperature. A blend of monofluorotrichloromethane and dichlorodifluoromethane was made separately, under pressure at room temperature, in a 1000 cu. in. stainless steel pressure vessel by feeding 3090 g. of liquid dichlorodifluoromethane to 13,372 g. of liquid monofluorotrichloromethane in the vessel under pressure. The vessel was shaken intermittently to dissolve dichlorodifluoromethane vapor in the monofluorotrichloromethane liquid and thereby to reduce the pressure. Final pressure of the monofluorotrichloromethane/dichlorodifluoromethane mix at 76° F. was 20 p.s.i. About 300 lbs. of polyol component was made by blending two batches of similar, but not identical, compositions weighing about 150 lbs. each. The combined batch had the following composition:

|  | Lbs. |
|---|---|
| Polyol (as used in Example 1) | 260.0 |
| Silicone dispersing agent (as used in Example 1) | 4.5 |
| Catalyst (TMBDA) | 1.80 |
| Monofluorotrichloromethane / dichlorodifluoromethane blend | 34.03 |
| Total | 300.33 |
| Monofluorotrichloromethane in batch | 27.63 |
| Dichlorodifluoromethane in batch | 6.40 |
| Total | 34.03 |

In order to bring the concentration of monofluorotrichloromethane to a predetermined level, 11.71 lbs. of monofluorotrichloromethane was added to the combined batch, making a total of 39.34 lbs. of monofluorotrichloromethane and 6.40 lbs. of dichlorodifluoromethane, or a weight proportion of monofluorotrichloromethane/dichlorodichloroemthane/dichlorodifluoromethane of 6.14/1.

EXAMPLES 4–7

These examples describe the preparation of polyol components for subsequent use in making polyurethane foams. The components were prepared for comparison experiments to determine the optimum monofluorotrichloromethane/dichlorodifluoromethane ratio at a constant percentage of total fluorocarbon. The equipment and process steps described in Example 3 were employed here. The compositions of the polyol components were as follows.

The comparison involved preparing a series of moldings by pouring a series of charges of different weights into Mold (1), described above, and observing the results. The weights were chosen to provide a series of increasing rise heights in the mold, until at some particular weight the mold was completely filled to its 48″ height. Above this minimu weight for filling the mold, any additional molding material merely increased the density of the solid moldings. Table I shows the results of these molding tests.

TABLE I

| Average weight of molding (g.) | Polyol of Example 1 (Blowing agent—all monofluorotrichloromethane) | | Polyol of Example 2 (Blowing agent—mixture of monofluorotrichloromethane and dichlorodifluoromethane) | |
|---|---|---|---|---|
| | Rise height (in.) | Quality of molding in upper 4″ of mold | Rise height (in.) | Quality of molding in upper 4″ of mold |
| 224.5 | [1] 45.7 | Frothy, not filled | [2] 48 | Few small voids at top. |
| 338.1 | 48 | Many ¼″ voids throughout | 48 | Essentially void-free. |
| 337.8 | 48 | do | 48 | Do. |

[1] Required 291.7 g. as weight of molding to fill 48″ mold using polyol of Example 1.
[2] Required 193.9 g. as weight of molding to fill 48″ mold using polyol of Example 2.

These results indicate:

(1) That when the moldings are made with a polyol component containing a mixture of monofluorotrichloromethane and dichlorodifluoromethane (Example 2), the mold is filled and produces a good molding with as little as 224.5 g. of molding material, whereas moldings made with polyol component containing only monofluorotri-

| | Example | | | |
|---|---|---|---|---|
| | 4 | 5 | 6 | 7 |
| Polyol in Example 1 (g.) | 73,764 | 76,383 | 73,674 | 73,764 |
| Dispersing Agent in Example 1 (g.) | 1,317 | 1,369 | 1,317 | 1,317 |
| TMBDA (g.) | 702.5 | 730 | 526.9 | 702.5 |
| Monofluorotrichloromethane (g.) | 11,556 | 11,556 | 10,819 | 12,294 |
| Dichlorodifluoromethane (g.) | 737.6 | 1,220 | 1,475 | 0 |
| Total (g.) | 88,077.1 | 91,258.0 | 87,811.9 | 88,077.5 |
| Percent (monofluorotrichloromethane and dichlorodifluoromethane) | 14.0 | 14.0 | 14.0 | 14.0 |
| Ratio: monofluorotrichloromethane/dichlorodifluoromethane | 94.0/6.0 | 90.45/9.55 | 88.0/12.0 | 100/0 |

EXAMPLE 8

This example describes the preparation of moldings from the polyol components of Examples 1 and 2 for comparison purposes. Each polyol component was used in conjunction with Isocyanate B (the commercially available isocyanate reported to be a polymer of diphenyl methane diisovyanate having 2–5 isocyanate groups per molecule), and mixed by means of a commercial foam mixing machine, fitted with a reverse spiral impeller and a slotted, close clearance housing. The molding conditions were as follows.

| | Isocyanate | Polyol |
|---|---|---|
| Metering tubes, dia. in | 3/32 | 1/8 |
| 6-second flow rate, g | 111.3 | 116.2 |
| Temperature, °F | 123 | 74 |

NOTE.—Mold temperature 120°F. ± 3°.

Three molds were employed for the experimentation.

(1) Rolled aluminum bar stock
  Cavity size 3″ x ½″ x 48″
  Outside size 4″ x 2½″ x 48¾″,
    with cavity and outside dimensions concentric and symmetrical
  Pour hole and plug 16″ from lower end on upper 3″ x 48″ face.
(2) Same as (1), except that outside dimension of 2½″ reduced to 1″.
(3) Cast aluminum with contoured cavity approximately 7/16″ x 8½″ x 20½″ with mold walls approximately ½″ thick.

chloromethane (Example 1) require at least 291.7 g. of molding material to barely fill the mold.

(2) That moldings are prepared which are essentially free of voids at the upper end of the molding with a much lower weight of molding material (and therefore a finished molding of lower density) when using a mixture of monofluorotrichloromethane and dichlorodifluoromethane than when the blowing agent is solely monofluorotrichloromethane.

(3) That even when as much as 377.8 g. of molding material is used, where monofluorotrichloromethane is the sole blowing agent, the molding is of inferior quality with respect to a large number of voids.

EXAMPLE 9

This example compares the quality of moldings when employing different blowing agents. The polyol of Example 3 was mixed with an isocyanate prepolymer prepared from Isocyanate B and polypropylene glycol of MW about 400, by means of a commercial foam mixing machine. A number of large (up to 500 cu. in.) contoured moldings of 20–22 lb./ft.$^3$ density were prepared in cast aluminum molds. The same molding operations were undertaken with a molding material which differed only in that the blowing agent was all monofluorotrichloromethane. The moldings made with a mixture of monofluorotrichloromethane and dichlorodifluoromethane as the blowing agent resulted in complete fill out of molds and almost total elimination of voids at the rise end of the molding. The moldings made without any dichlorodifluoromethane being present exhibited voids and lack of fillout. At high percentages of dichlorodifluoromethane, when molding large, thick sections of at least 375 cu. in volume and at least 1 in. thickness, there was an occasional formation in the skin of abnormally high thickness and density of branch-shaped blisters. However, when smaller sections (less than 1 in. thickness) were molded the blisters did not form.

TABLE II

| Polyol component (Example No.) | Weight ratio: monofluorotrichloromethane/ dichlorodifluoromethane | No vents in mold | | 3–6 vents in mold | |
|---|---|---|---|---|---|
| | | Voids | Knit line | Voids | Knit line |
| 4 | 94.6 | Large voids at several locations. | Almost undetectable | Few voids scattered throughout molding. | Almost undetectable. |
| 5 | 90.45:9.55 | Few voids in extremities of molding and at knit line. | Very sound, undetectable | Almost void-free | Very sound, undetectable. |
| 6 | 88.12 | | | do | Almost undetectable. |
| 7 | 100.0 | Many large and small voids throughout molding. | Moderately sharp line of juncture. | Many large and small voids throughout molding. | Sharp line of juncture. |

EXAMPLE 10

This example compares the quality of moldings made with different proportions of monofluorotrichloromethane/dichlorodifluoromethane in the blowing agent. The polyol components of Examples 4, 5, 6 and 7 were molded with the same foam machine, prepolymer, and molds as in Example 9. Table II represents a summary of the data resulting from inspecting a large number of such molded parts. The contoured mold employed was one which had been previously found to be the most difficult to fill out. One mold was a large C-shaped cavity, 505 cu. in volume, ¾" to 2" thick, and about 56 in. from one end to the other along the centerline of the "C," with several small, detailed contours near the tips. In the instances where the blowing agent was solely monofluorotrichloromethane, the failure to fill out was usually due to one of the following reasons:

(1) As a result of the continuing polymerization the expanding foam near the end of its rise became less and less fluid, making it difficult to fill the sharp contours. Efforts were made to get complete fillout by increasing the resin charge by 25–30% over that normally used, and by venting the troublesome areas to permit the excess resin to flush the void-filled foam out of the cavity. This technique did not solve the problem, because (a) the rapid rise of the foam caused the extremely viscous nearly polymerized foam to bridge the troublesome areas and sweep past voids in sharp contours rather than flush them out of the mold, and (b) the nearly polymerized foam is too solidified to escape through vent holes of reasonably small size.

(2) When the mold was turned over to the position of an inverted "U" to try a different filling procedure by pouring unexpanded resin into each of the arms of the mold, the arms were filled out completely, but two separate arising foam fronts had to unite in an undetectable knit line for the molding to be acceptable. In this instance the frothy, void-filled foam fronts had been polymerizing for too long to knit and flow together into a sound, void-free knit line.

In using the mixture of monofluorotrichloromethane/dichlorodifluoromethane as the blowing agent, particularly at the optimum dichlorodifluoromethane content, the fluidity of the mix when it reached the extremities of the mold was much greater (as evidenced by fluid squirting out of vent holes) than when the blowing agent was entirely monofluorotrichloromethane. Furthermore, the quality of the moldings was considerably better when the mixture of monofluorotrichloromethane and dichlorodifluoromethane was employed.

It can be seen from Table II that replacement of monofluorotrichloromethane by dichlorodifluoromethane in increasing amounts improves the knitting of the two rising foam fronts, indicating a more flowable condition in the expanding foam at the instant of mold fillout. It can also be seen that this condition leads to almost complete elimination of voids, even in an unvented (although not hermetically sealed) mold.

Although the invention has been described in considerable detail with reference to certain preferred embodiments thereof, it will be understood that variations and modifications can be effected within the spirit and scope of the invention as described hereinabove and as defined in the appended claims.

I claim:

1. In a process for the production of uniform polyurethane moldings substantially free of surface voids by
   (1) mixing a polyisocyanate, a polyol, and a blowing agent;
   (2) passing the resultant liquid nonreacted, non-expanded mixture into the cavity of a mold; and
   (3) after said liquid has expanded and filled the mold cavity as the polyurethane is formed, curing and removing the resultant molded article;
the improvement which comprises employing as the blowing agent, a mixture of two volatile blowing agents, the less volatile of which has an atmospheric boiling point of 30° to 120° F. and the more volatile of which has an atmospheric boiling point of −50° to 50° F. the difference between the boiling points of said blowing agents being from 30° to 150° F., the weight ratio of the less volatile to the more volatile being in the range of about 1:1 to 30:1, and which blowing agent, after being mixed with said polyisocyanate and said polyol to produce said resulttant liquid non-expanded mixture, exhibits a vapor pressure of not greater than one atmosphere at 110° F.

2. The process of claim 1 wherein said volatile blowing agents are selected from the group consisting of fluorocarbons, chlorofluorocarbons, bromofluorocarbons, and perfluorocarbons.

3. The process of claim 1 wherein said blowing agent consists of a mixture of two fluorochloroalkanes.

4. The process of claim 1 wherein the mixture additionally contains a polyurethane surface-active dispersing agent and a polyurethane catalyst.

5. The process in for the production of uniform, self-skinned polyurethane molding substantially free of surface voids which comprises:
   (1) mixing a polyisocyanate, a polyol, a polyurethane catalyst, a polyurethane surface active dispersing agent, and a blowing agent, said blowing agent comprising a mixture of two fluorochloroalkanes, the highest boiling one having an atmospheric boiling point of 70° to 120° F., and the lowest boiling one having an atmospheric boiling point of −25° to 40° F.; the difference between the boiling point of said blowing agent being 30° to 150° F., the weight ratio of the less volatile to the more volatile being in the range of about 1:1 to about 30:1, and which blowing agent, after being mixed with said polyisocyanate, said polyol, said catalyst, and said dispersing agent, exhibits a vapor pressure of not greater than one atmosphere at 110° F. in the resulting liquid non-expanded mixture;
   (2) thereafter passing the resultant liquid non-expanded mixture into the cavity of a mold;
   (3) after said liquid has expanded and filled the mold cavity as the polyurethane is formed, curing and removing the resultant molding as an accurate reproduction of said mold cavity, said molding being substantially free of surface voids and having a dense skin.

6. The process of claim 5 wherein said mixture of fluorochloroalkanes consists essentially of a mixture of dichlorodifluoromethane and trichloromonofluoromethane.

References Cited
UNITED STATES PATENTS 3,182,104   5/1965   Civik _____ 264—54

OTHER REFERENCES

Rigid Plastics Foams by Ferrigno, Reinhold, New York, N.Y. 1963, pp. 42–54 and cover page. TA 455P5F47C3.

Handbook of Foamed Plastics by Bender, Lake Pubcover page TP1183F6B4 C.2.

Dupont Bulletins "Frothed One-shot Resistant Urethane Foam" by O'Meara, Oct. 22, 1962, pp. 1–8.

Chemical Engineering Progress "Frothing—a New Method for Producing Urethane Foams" by Knox, October 1961, Vol. 57, No. 10 pp. 40–47. 264154.

Advances in Polyurethane Technology by Buist et al., "Rigid Foams," pp. 202–207 and cover page, 1968, Maclaren and Sons, London.

Dupont "Urethane Foam" Bulletin, "Properties of Rigid Urethane Foams" by Sterryard, June 21, 1963, pp. 5–7 and cover.

ROBERT F. WHITE, Primary Examiner

J. B. LOWE, Assistant Examiner

U.S. Cl. X.R.

260—2.5 AF, 2.5 AZ; 264—51